Jan. 14, 1936.  R. H. WHITEHEAD ET AL  2,027,944
AUTOMATIC STARTING DEVICE FOR SYNCHRONOUS MOTORS
Filed Nov. 26, 1929  2 Sheets-Sheet 1

INVENTORS

Jan. 14, 1936.   R. H. WHITEHEAD ET AL   2,027,944
AUTOMATIC STARTING DEVICE FOR SYNCHRONOUS MOTORS
Filed Nov. 26, 1929   2 Sheets-Sheet 2
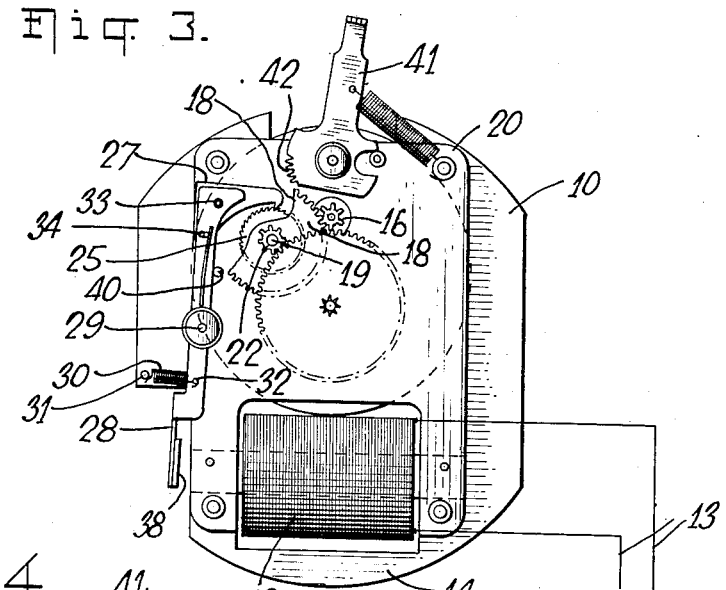
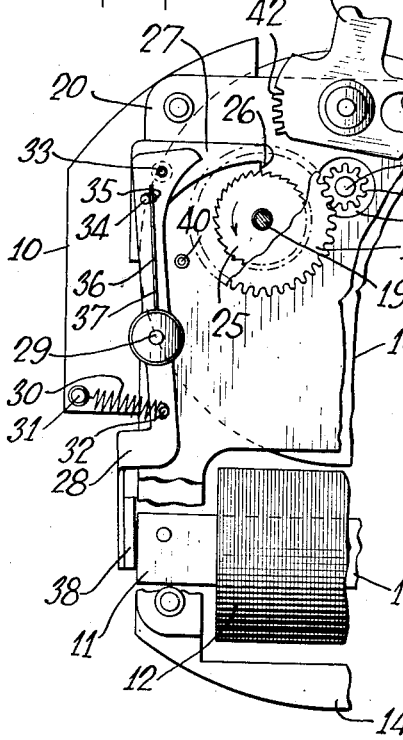
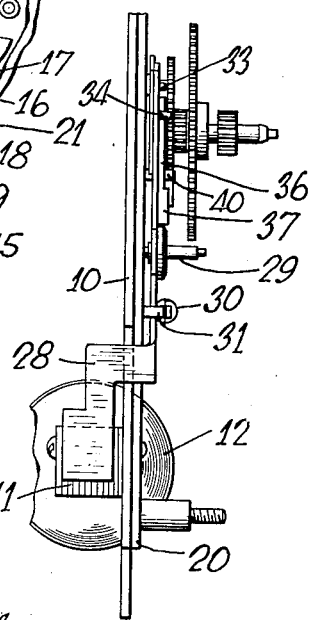
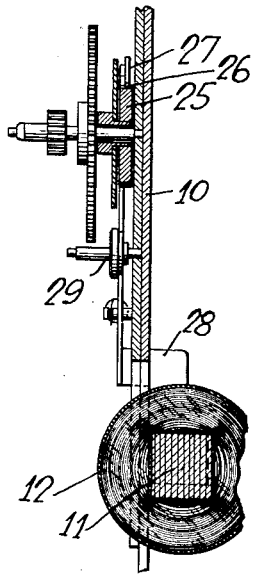
INVENTORS
Richard H. Whitehead &
BY Wilson E. Porter.
Warfield & Watson
ATTORNEYS.

Patented Jan. 14, 1936

2,027,944

UNITED STATES PATENT OFFICE 2,027,944

AUTOMATIC STARTING DEVICE FOR SYNCHRONOUS MOTORS

Richard H. Whitehead and Wilson E. Porter, New Haven, Conn., assignors to The New Haven Clock Co., New Haven, Conn., a corporation of Connecticut Application November 26, 1929, Serial No. 409,808

9 Claims. (Cl. 172—279)

This invention relates to automatic starting devices for motors of the synchronous type, and particularly to devices which operate to start synchronous motors of the kind adapted for driving clock-trains and the like when the current is turned on.

The invention has for its object generally an improved starting device of the character indicated which is efficient, economical, and readily manufactured.

More specifically, it is an object to provide a starting device which is actuated electro-magnetically when the current is turned on and arranged to bring the motor rotor up to or above driving speed.

Another object is to provide an electro-magnetic starting device for motors of the type indicated which is structurally united with the motor parts so as to require a relatively small number of component elements, while at the same time making for increased operating efficiency.

Still another object is to provide an electro-magnetic operating device which will engage the parts to give a starting torque thereto and then will automatically become disengaged therefrom so that the motor is thereafter free to run unhindered by the starting mechanism.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which:

Fig. 3 is a vertically sectional view taken on the line 3—3 of Fig. 2 showing details of a starting device as applied to a motor in accordance with the present invention;

Fig. 4 is an enlarged fragmentary view showing further details of the starting device disclosed in Fig. 3;

Fig. 5 is a side elevation of the motor and starting device shown in Fig. 3; and Fig. 6 is a vertical sectional view of the mechanism shown in Fig. 5.

Figure 1:
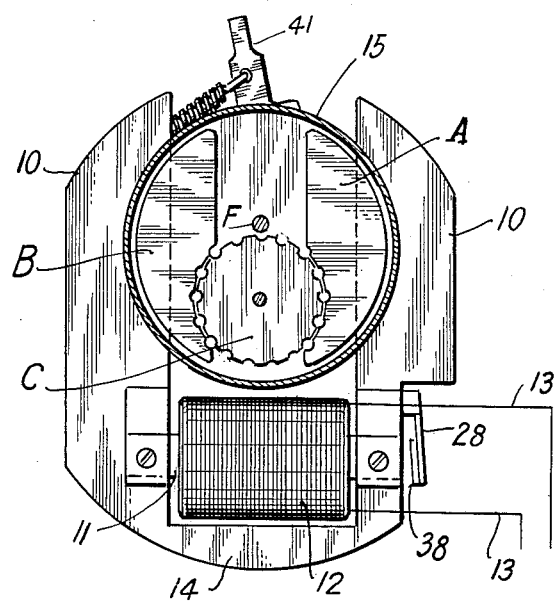
Figure 1 is a rear elevation of a clock mechanism, having a motor of the synchronous type, having a portion of the motor mechanism casing broken away along the line 1—1 of Figure 2 in order to better show the interior construction.
Figure 2:
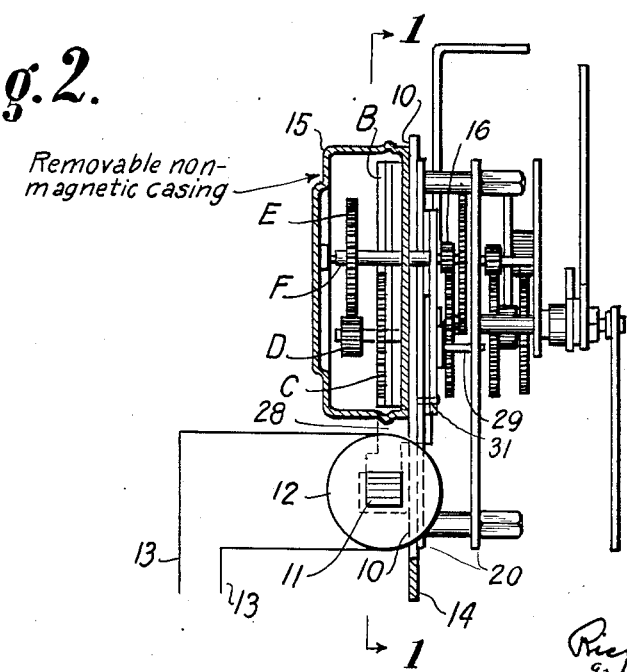
Fig. 2 is a side elevation of the motor and clock-train shown in Fig. 1.

Referring now to the drawings, and particularly to Figs. 1 and 2, 10 denotes a generally U-shaped stator of a motor of the synchronous type, which stator is of magnetic material and is provided with a magnetic yoke 11 arranged to bridge the legs of the U near its base, this yoke having thereon an exciting winding 12 which is supplied with energizing current through the pair of conductors indicated at 13 and which lead from any convenient source of alternating current, for example, a 60-cycle, 110 volt source. The base of the U, shown at 14, is seen to serve as a magnetic shunt and is accordingly made to have a relatively small cross-sectional area in order to have the major portion of the magnetic flux thread across the upper ends of the legs of the U and traverse a rotor which is operatively disposed in a removable housing 15 constructed of non-magnetic material. This housing may contain any convenient arrangement of rotor in which such rotor is adapted to execute complete revolutions in equal periods of time irrespective of the load. A preferred arrangement, however, involves the use of pole-shoes A—B secured in the rotor housing between which rotates a rotor disc C having a series of small salient poles as shown in the co-pending application, filed August 8th, 1929, by Richard H. Whitehead, Serial No. 384,265. The rotor disc C is on the same shaft with a pinion D which in turn drives a gear E upon a shaft F. All of the foregoing parts, including the pole pieces and gearing, are enclosed within the removable housing 15, but the shaft F extends through the walls of said casing and carries upon its outer end a pinion 16. By this construction it will be seen that the operating parts of the motor are self-contained within the casing, which has no electrical parts or connections. When, however, the casing is clamped against the legs of the U-shaped member 10 the pole pieces A and B are magnetized to opposite polarity and, under such circumstances, if the rotor C is brought to a synchronous speed it will continue to hold that speed in the well-known manner.

The pinion 16 is adapted to be put in mesh with a motion-transmitting gear 18 which is connected to and is a part of the clock train driven by the motor, the gear 18 here being shown as provided with an arbor 19 pivoted between a pair of spaced plates 20 which comprise the frame for the clock-train, and are structurally separate from the motor. These frame plates may have any convenient form, but are preferably rectangular plates of non-magnetic material cut away so as to fit directly on the stator of the motor, and are also shaped to accommodate the rotor parts. In accomplishing this latter, the plate 20 which fits directly against the stator 10, has an enlarged perforation, as shown at 21 in Fig. 4, designed to be positioned over the driving pinion 16 to permit of adjustment so as to secure proper engagement between the gear 18 and pinion 16. The arbor 19 is adapted to transmit the driving motion of the pinion 16 to the gear train mounted in the frame plates through its pinion 22, as indicated in Fig. 3.

The starting mechanism is designed to be automatically operated by the supply of energy to the stator magnets and it is so arranged that it will automatically come into engagement during the starting action to move the rotor and thereafter automatically pass out of engagement to leave the rotor free to function without hindrance. Different forms of disconnectible connections of this kind are known but I have herein chosen for illustration a ratchet and pawl as a practical example thereof.

The automatic starting device of the present invention may be associated directly with the motor driving shaft 17, but is preferably associated with the arbor 19, since the engagement of the gear 18 with the pinion 16 permits a slower motion of the parts of the starting device when moving to attain the speed desired at starting. To this end a ratchet wheel 25 is secured directly on the arbor 19 and is adapted to be engaged by a tooth 26 on an arm of a ratchet member 27. This ratchet member is movably carried at one end of an actuating lever 28 which is arranged to be electro-magnetically operated. This lever is pivoted, as indicated at 29, to the frame plates 20 and has a spring 30 connected from a fixed stud 31 to a movable stud 32 carried by the lever in order to bias the same in a position such that the ratchet tooth 26 reaches over and downwardly to engage with the upwardly projecting teeth of the ratchet wheel 25. In order that this motion of the lever 28 under the influence of spring 30 may not be interfered with by the ratchet tooth 26 coming in contact with the top of a tooth on the ratchet wheel 25 before the limit of throw is reached, the member 27 is yieldingly pivoted on the lever in any suitable manner permitting a limited motion of the member 27 of a character adapted to permit the ratchet parts to move sufficiently to accommodate the full throw of the lever 28. To this end, the member 27 has pivotal connection at 33 with the upper end of the lever and is provided with a pin 34 extending through an elongated slot in the upper end of the lever, this slot having its centre line disposed along the arc of travel executed by the pin 34 when the ratchet member turns about the pivoted center 33. In order to hold the arm member 27 yieldingly in engaging position, a leaf-spring 36 is provided having a base portion 37 which is made fast to an arm of the lever 28 while the upper end is free to press against the pin 34 in order to hold the same yieldingly in one end of the slot 35.

In order that the lever 28 may be electromagnetically actuated, the lower arm of the same is provided with a magnetic armature 38 which may be moved by any suitable electro-magnet. Where it is desired to unite the actuating magnet for the starting device herein provided with the motor structure, the field winding 12 is with advantage arranged to serve as the actuating magnet winding. To this end the actuating arm of the lever 28 is made to extend down to a point such that the armature 38 is held opposite the end of the magnetic yoke 11 which carries the field winding 12.

In operation, it is seen that the starting device of the present invention is actuated whenever current is turned on to energize the field winding 12, since by the arrangement the leakage flux from the ends of the yoke 11 is here utilized and is arranged to have magnitude sufficient to produce the desired starting effect.

When the field winding 12 is energized, it is seen that the armature 38 is thus drawn thereagainst so that the lever 28, which is normally in the position shown in Fig. 3, is moved therefrom to the position shown in Fig. 4. In the position shown in Fig. 3, the spring 30 operates to draw the lever 28 away from the field winding 12 and to cause the ratchet member 27 to move over as far as possible into engagement with the ratchet wheel. The limit of this motion is determined in any suitable manner, for example by means of a stop 40 disposed on the frame plates 20. The lever 28 engaging with the stop is shown in Fig. 3. Here it pushes the ratchet tooth 26 over several ratchet teeth so that the ratchet member has been oscillated about its pivot 33, thereby causing the pin 34 to engage repeatedly with and flex the upper end of the spring 37. The inward motion of the armature 38 caused by the pull of the field winding 12 when energized, causes the ratchet member 27 to pull upwardly against the ratchet teeth with which it is in engagement on the ratchet wheel 25 for a period of time determined by the arc of travel through which the ratchet member moves before it disengages with the ratchet tooth on the ratchet wheel and assume the position shown in Fig. 4. During this arc of travel it is seen that the ratchet member 27 gradually moves away from the ratchet wheel 25 so that when the position in Fig. 4 is attained, complete disengagement between the ratchet member 27 and the ratchet wheel 25 obtains, while the spring 36 has at the same time operated to move the pin 34 back against the far end of its slot, whereby the spring 36 then moves to its unflexed or normal position. Force from the pull of the magnet is transmitted through the lever 28 to the ratchet member 27 which is seen to apply torque to the ratchet wheel 25 during the pulling period while there is engagement between the ratchet teeth 26 and the ratchet wheel 25. This torque, operating for the period of time determined by the arc of engagement between the ratchet teeth and the ratchet wheel, is seen to produce a predetermined angular velocity of the ratchet wheel up to the time when disengagement of the ratchet parts takes place. The parts of the present starting device are so proportioned that the speed attained in this manner is the starting speed at which the motor rotor pulls into step with the flux alternations which propel the motor. Thus, it is seen that by the use of the present invention, as soon as current is turned on to energize the field winding 12, a desired starting torque is imparted to the ratchet wheel 26 and thence to the pinion 16, so that the period of time for which this torque operates produces a desired angular velocity in the ratchet wheel 26 and hence in the pinion 16, so that when disengagement between the ratchet parts occurs the motor is brought up to starting speed and thereafter the rotor runs in step with the flux alternations.

When the motor is thus started, it is seen that the continued energization of the field winding 12, holds the armature 38 thereagainst, so that the parts continue in the position shown in Fig. 4, and the ratchet parts remain in disengaging position. If for any reason the field winding becomes deenergized, then the armature 38 is released, and the actuating lever 28 moves to the position shown in Fig. 3 where the ratchet parts engage. This engagement of the ratchet parts continues as long as the field remains deenergized, for as soon as current is turned on, the armature 38 is then drawn to the position shown in Fig. 4, and by so moving, operates the ratchet parts to bring the rotor up to driving speed. The parts continue in the position shown in Fig. 4, while the motor normally drives the connected train.

While the automatic starting device of the present invention is a sufficient device for producing the starting of the motor whenever the current is turned on, it is contemplated that clock-trains of the present invention may also be provided in addition with manual starting devices such, for example, as shown in my co-pending application above referred to, and is here shown as comprising a manually manipulated lever 41 provided with an actuating gear segment 42 with which pinion 16 engages when the lever is manually thrown.

Since certain changes may be made in the above construction and different embodiments of the invention could be made without departing from the scope thereof, it is intended that all matter contained in the above description or shown in the accompanying drawings, shall be interpreted as illustrative and not in a limiting sense.

Having described our invention, what we claim as new and desire to secure by Letters Patent is:

1. The combination with a non-self-starting synchronous motor comprising a stator, an electric winding for energizing the same and a rotor having a driving shaft associated therewith, of a ratchet wheel in driving connection with said driving shaft, and an armature associated with said electric winding having an actuating part and ratchet tooth arranged to engage with said ratchet wheel when said winding is de-energized and adapted to impart a desired torque to said rotor through said ratchet wheel for a predetermined period of time when energized.

2. In a synchronous motor of the character described, the combination comprising a stator, an electric winding for energizing the same, a rotor having a driving shaft associated therewith, a ratchet wheel in driving connection with said driving shaft, a magnetic armature disposed to be moved by said electric winding, a pivoted lever connected to said armature and adapted to be actuated thereby, and a member carrying a ratchet tooth for engagement with said ratchet wheel yieldingly pivoted to said lever and arranged to engage wtih said ratchet whcel when said winding is de-energized and to disengage therefrom when said member has traveled through a predetermined path.

3. In a synchronous motor of the character described, the combination comprising a stator, means for energizing the same, a separable rotor housing on said stator having a rotor and projecting driving connections, a ratchet wheel disposed to impart a starting force to said connection, an armature positioned to be attracted by said stator, and an actuating lever disposed to be moved by said armature and provided with a yielding member having a ratchet tooth adapted to engage with said ratchet wheel when said armature is de-energized, said tooth and said ratchet wheel being arranged to engage only through a predetermined arc of travel.

4. In a synchronous motor of the character described, the combination comprising a stator, means for energizing the same, a separable rotor housing on said stator having a rotor and projecting driving connections, a ratchet wheel disposed to impart a starting force to said connection, an armature positioned to be attracted by said stator, an actuating lever arranged to be moved by said armature, a ratchet member yieldingly pivoted on said lever and having a tooth adapted for engagement with said ratchet wheel, a stop for determining the limit of motion of said lever and moved to the position for engagement with said ratchet wheel, and a stop on said lever for said ratchet member whereby the same disengages with the ratchet wheel after a predetermined arc of travel.

5. In a synchronous motor of the character described, the combination comprising a stator, means for energizing the same, a separable rotor housing on said stator having a rotor and projecting driving connections, a ratchet wheel disposed to impart a starting force to said connection, an electro-magnetic means including an armature positioned to be attracted by the magnetism of said stator, a pivoted actuating lever, a ratchet member having a tooth adapted for engagement with said ratchet wheel and yieldingly pivoted to said lever, a stop for determining the limit of movement of said lever when moved to ratchet engaging position, and a stop on said lever for limiting the motion of said ratchet member with respect to said lever when said lever is being moved away from first said stop, whereby disengagement is effected between said ratchet members when said lever has turned through a predetermined angle.

6. In a synchronous motor of the character described, the combination comprising a stator having a winding for energizing the same, a rotor, gearing connected to said rotor, a member operatively associated with said gearing adapted to be connected thereto to impart a mechanical impulse to said rotor and an armature movable by the electrical field of said winding for causing said member to engage said gearing and transmit thereto the movement of said armature to start said motor.

7. A synchronous motor having, in combination therewith, magnetic means that is attracted to said motor when the motor is energized, and that has a member that imparts an initial rotary impulse to the rotor of the motor independently of the driving reaction between the rotor and the stator of the motor.

8. A synchronous motor that includes a stator and a rotor, starting mechanism for the motor that has an engageable and disengageable driving connection with the rotor, and means actuated by the energized stator which operates said starting means to impart an initial driving impulse to the rotor and which thereafter maintains said starting means free from engagement with the rotor so long as the stator remains energized.

9. A synchronous motor comprising magnet pole pieces, a rotor mounted in workable relation to said pole pieces and an electro-magnetic inductor to energize said pole pieces through an alternating electric current passing through said inductor and causing a continuous rotation of said rotor and means actuated by said inductor and mechanically engaging said rotor to momentarily revolve said rotor at the introduction of current into said motor.

RICHARD H. WHITEHEAD.
WILSON E. PORTER.